R. S. WHITNEY.
HUMIDIFIER FOR GAS ENGINES.
APPLICATION FILED OCT. 31, 1917.

1,289,026.

Patented Dec. 24, 1918.

Inventor,
Rolvin S. Whitney
by S. W. Bates Atty.

UNITED STATES PATENT OFFICE.

ROLVIN S. WHITNEY, OF LEWISTON, MAINE.

HUMIDIFIER FOR GAS-ENGINES.

1,289,026.

Specification of Letters Patent.   Patented Dec. 24, 1918.

Application filed October 31, 1917.   Serial No. 199,508.

*To all whom it may concern:*

Be it known that I, ROLVIN S. WHITNEY, a citizen of the United States, residing at Lewiston, in the county of Androscoggin and State of Maine, have invented certain new and useful Improvements in Humidifiers for Gas-Engines, of which the following is a specification.

My invention may best be understood by reference to the accompanying drawing in which—

Figure 1:
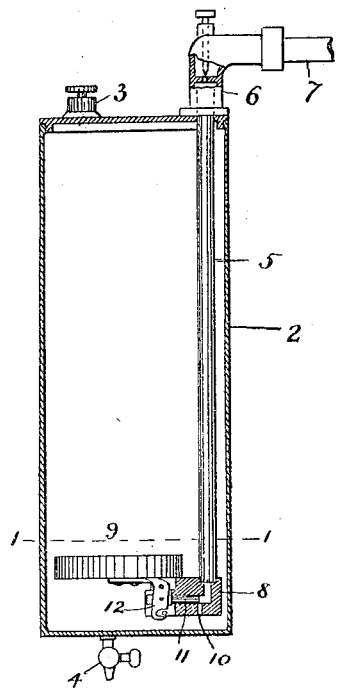
Figure 2:
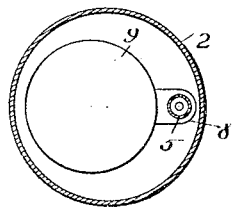

Figure 1 is a central vertical section through the water tank showing certain portions in elevation and Figure 2 is a section on the line 1—1 of Fig. 1.

Referring to the drawing 2 represents a water tank here shown as cylindrical in form. The tank has a filling nozzle 3 and a drip cock 4 for drawing off the water. The water is drawn from the tank by a pipe 5 connecting at the top of the tank with a needle valve 6 by which the water supply is regulated. A pipe 7 connects the apparatus with the manifold of the engine.

Water is admitted to the pipe through the piston valve 8 having therein a piston 11 operating in a substantially horizontal passage. A port 10 is formed in the valve adjacent to the end of the piston so that the longitudinal motion of the piston will open and close the port. The piston 11 is opened and closed by a relatively thin substantially disk like approximately horizontal float 9, preferably of cork, connected by means of an elbow lever 12 with the rear end of the piston 11.

The rising of the float when the latter is submerged draws back the piston and opens the port 10 and the dropping of the float when the water is exhausted closes the port.

Thus it will be seen that while there is water enough in the tank to cause the float to rise to its upper position the water will flow to the engine through the port 10, the pipe 5 and the valve 6.

When the water in the tank is exhausted the port 10 will automatically close and the outlet whereby the water or air leaves the tank will be closed.

A device constructed on this principle delivers a charge of water in the form of a fine spray at each intake of gas and air keeping the cylinder and the ignition plugs free from carbon and greatly improving the operation of the engine. The closing of the water duct when the water is exhausted is of great advantage in effecting the steady running of the engine.

I claim:

1. In a humidifier for gas engines, the combination of a water tank, an outlet pipe for the same leading from the lower portion of the said tank and provided with an opening, a valve member movable to cover and uncover said opening and a relatively thin substantially horizontal float also located at the lower portion of the said tank and operatively connected with the said valve member to close the said opening when the water nears the lower end of the pipe whereby nearly the entire contents of the tank may be exhausted without affecting the proper operation of the valve member.

2. In a humidifier for gas engines the combination of a water tank, an outlet for the same leading from the lower portion of the tank and provided with an approximately horizontal passage and having an opening communicating therewith, a valve member operating in the said passage to cover and uncover the said opening, and an approximately horizontal relatively thin disk like float also located at the lower portion of the tank and operatively connected with the valve member to close the said opening when the water nears the lower end of the said pipe.

In testimony whereof I affix my signature.

ROLVIN S. WHITNEY.

Copies of this patent may be obtained for five cents each, by addressing the "Commissioner of Patents, Washington, D. C."